(12) United States Patent
Wei et al.

(10) Patent No.: US 9,531,029 B2
(45) Date of Patent: Dec. 27, 2016

(54) PLANAR SOLID OXIDE FUEL CELL STACK AND ITS INTERCONNECT THEREOF

(71) Applicant: NATIONAL CHIAO TUNG UNIVERSITY, Hsinchu (TW)

(72) Inventors: Shih-Sin Wei, Taipei (TW); Jong-Shinn Wu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 289 days.

(21) Appl. No.: 14/016,543

(22) Filed: Sep. 3, 2013

(65) Prior Publication Data
US 2014/0342263 A1   Nov. 20, 2014

(30) Foreign Application Priority Data

May 14, 2013   (TW) .............................. 102117038 A (51) Int. Cl.
| | | |
|---|---|---|
| *H01M 8/04* | (2016.01) | |
| *H01M 8/24* | (2016.01) | |
| *H01M 8/00* | (2016.01) | |
| *H01M 8/02* | (2016.01) | |
| H01M 8/12 | (2016.01) | |

(52) U.S. Cl.
CPC ............ *H01M 8/2425* (2013.01); *H01M 8/006* (2013.01); *H01M 8/0247* (2013.01); *H01M 8/0258* (2013.01); *H01M 8/247* (2013.01); H01M 2008/1293 (2013.01); Y02E 60/50 (2013.01); Y02E 60/525 (2013.01)

(58) Field of Classification Search
CPC .... H01M 8/04; H01M 8/0421; H01M 8/2425; H01M 8/247; H01M 8/006; H01M 8/0247; H01M 8/0258

USPC .................................................. 429/456, 521
See application file for complete search history.

(56) References Cited

U.S. PATENT DOCUMENTS

| | | | | |
|---|---|---|---|---|
| 2006/0286431 | A1* | 12/2006 | Chyou | ................ H01M 8/0258 |
| | | | | 429/490 |
| 2008/0193825 | A1 | 8/2008 | Nguyen et al. | |

FOREIGN PATENT DOCUMENTS

| | | |
|---|---|---|
| TW | M273828 | 3/1994 |
| TW | 200950189 A | 12/2009 |
| TW | M452465 U | 5/2013 |

OTHER PUBLICATIONS

K.P. Recknagle; R.E. Williford; L.A. Chick; D.R. Rector; M.A. Khaleel; Three-Dimensional Thermo-Fluid Electrochemical Modeling of Planar SOFC Stacks; Journal of Power Sources 113 (2003) 109-114.

(Continued)

*Primary Examiner* — Karie O'Neill Apicella
(74) *Attorney, Agent, or Firm* — Rosenberg, Klein & Lee (57) ABSTRACT

A planar solid oxide fuel cell stack which can expand in both the vertical and horizontal directions is disclosed. The planar solid oxide fuel cell stack comprises an interconnect which consists of an interconnect body, a first flowing area and a second flowing area, wherein the first and the second flowing area are disposed on opposite side of the interconnect body, and have one gas inlet and two gas outlets, respectively. By employing multiple hexagonal interconnects for cell stack expanding in the horizontal direction, each three stacks can share the same pipeline of the flow channel, thereby reaching the goals of reducing the space and materials required and system complexity as well.

5 Claims, 11 Drawing Sheets

(56) References Cited

OTHER PUBLICATIONS

C.M. Huang; S.S. Shy; C.H. Lee; On Flow Uniformity in Various Interconnects and its Influence to Cell Performance of Planar SOFS; Journal of Power Sources 183 (2008) 205-213.
Ping Yuan; Effect of Inlet Flow Maldistribution in the Stacking Direction on the Performance of a Solid Oxide Fuel Cell Stack; Journal of Power Sources 185 (2008) 381-391.

* cited by examiner

PLANAR SOLID OXIDE FUEL CELL STACK AND ITS INTERCONNECT THEREOF

BACKGROUND OF THE INVENTION

Field of the Invention

The present invention relates to a solid oxide fuel cell stack, and more particularly to a solid oxide fuel cell stack that can expand both in the vertical and horizontal directions and use simple flow channel design to reach a uniform flow distribution.

Description of the Prior Art

Generally speaking, solid oxide fuel cell (SOFC) can be classified into two types, including a tube SOFC and a planar SOFC, according to its shape. In order to raise the powering voltage of the system it is applied to, one approach is to serially connect a plurality of fuel cells to increase its output voltage. Since the planar SOFCs can be stacked and serially connected in a much more costless and spaceless way compared to tube SOFCs, they are mostly widely used in the recent markets nowadays.

Based on different processes, solid oxide fuel cells can also be classified into four kinds, including an electrolyte-supported SOFC, an anode-supported SOFC, a cathode-supported SOFC and a metal-supported SOFC. The electrolyte-supported SOFC was mainly utilized in the past to solve the problems that fuel stack may crack easily, however, there were still issues relating to the electrolyte-supported SOFCs due to its high operating temperature which is usually around 1000K~1100K. In order to decrease the operating temperature, one approach is to cut down the thickness of the electrolyte in the fuel stack. Therefore, so far as production cost and complexity of the production itself are concerned, the anode-supported SOFC are gradually used to replace the rest three kinds of SOFCs. In general, the anode-supported SOFC can have the best powering efficiency when its cathode thickness equals to 20 μm. Nevertheless, it should be noticed that when the cathode thickness is 20 μm, it is way too thin for a solid oxide fuel cell. When it is involving with a traditional interconnect which has linear flow channels, it affects the diffusion of the oxygen thereby reducing its power efficiency since an area that the interconnect covers and is exposed to the cathode of the fuel stack is too large.

Moreover, the gas flow itself also has great impact on the powering efficiency of the fuel cell. Several prior arts provide different ways which relate to varying the width of the flow channel to make the gas flow uniform. However, these designs are still too complicated. For example, although a cross-flow pattern can provide a simpler flow channel design, when it is applied to the SOFC, the fuel cell has the problems of low powering efficiency and large temperature difference inside the cell.

Besides, when the system involves with a plurality of SOFCs, these conventional fuel cells can only be connected in a serial direction, which needs to increase the area of the cell module or to use a great number of serially-connected cell modules. However, increasing the area of the cell module replies on much more advanced technology. More serially-connected cell modules affect the uniformity of the gas flowing into the interconnect, thereby having great impact on the temperature and voltage distribution of the system and reducing its operating life-time. Moreover, when employing a plurality of cell modules, it increases both the complexity and cost of the system.

On account of above, it should be obvious that there is indeed an urgent need for the professionals in the field for a new solid oxide fuel cell stack to be developed that can effectively reach a uniform gas distribution flowing into its interconnect, meanwhile maintain its high powering efficiency and solve the temperature difference problem occurring in the prior design.

SUMMARY OF THE INVENTION

In order to overcome the above-mentioned disadvantages, one major objective in accordance with the present invention is provided for a novel planar solid oxide fuel cell stack and its interconnect, which involves with a counter-flow design to make the gas uniformly flowing into the interconnect and solve the prior problems that the powering efficiency was too low since the interconnect itself covered the cathode of the cell stack.

Another objective of the present invention is provided for a novel planar solid oxide fuel cell stack and its interconnect, which are shaped into hexagonal design. When connecting more than one fuel cell stacks, these hexagonal fuel cell stacks can expand both in the vertical and horizontal directions, thereby reducing the space, production cost and complexity of the system module.

Still another objective of the present invention is provided for a novel planar solid oxide fuel cell stack and its interconnect, which utilizes a larger inlet, outlet and non-penetrating bottom design to prevent the cell module itself from having uneven gas flow.

In one aspect, the present invention provides an interconnect which is disposed between two solid oxide fuel cells for collecting their current generated. The interconnect comprises an interconnect body, a first flowing area and a second flowing area, wherein the first flowing area is disposed on a first side of the interconnect body. On one end of the first flowing area is a first gas inlet and on the other end of the first flowing area are two first gas outlets which connect with the first gas inlet. The second flowing area is disposed on a second side of the interconnect body, wherein on one end of the second flowing area is a second gas inlet and on the other end of the second flowing area are two second gas outlets which connect with the second gas inlet. The second gas inlet is disposed between the two first gas outlets, and the first gas inlet is disposed between the two second gas outlets.

According to one embodiment of the present invention, a plurality of ribs can be disposed on the first flowing area and a plurality of flow channels are formed between each two adjacent ribs such that a first gas can flow in the flow channels.

In one embodiment, the first gas for example can be hydrogen or natural gas.

According to another embodiment of the present invention, a conductive aperture material or metal net can be disposed on the second flowing area. By employing the conductive aperture material or metal net on a cathode side of the interconnect, the prior problems that the powering efficiency of the fuel cell was low since its cathode was too thin can thus be successfully solved.

In another aspect, the present invention further provides a planar solid oxide fuel cell stack, which comprises two solid oxide fuel cells, an interconnect disposed between the solid oxide fuel cells for collecting their current generated, a top cap and a bottom base. The interconnect itself comprises an interconnect body, a first flowing area and a second flowing area, wherein the first flowing area is disposed on a first side of the interconnect body. On one end of the first flowing area is a first gas inlet and on the other end of the first flowing area are two first gas outlets which connect with the first gas inlet. The second flowing area is disposed on a second side of the interconnect body, wherein on one end of the second flowing area is a second gas inlet and on the other end of the second flowing area are two second gas outlets which connect with the second gas inlet. The second gas inlet is disposed between the two first gas outlets, and the first gas inlet is disposed between the two second gas outlets.

The top cap is disposed above the solid oxide fuel cells and the interconnect. The bottom base is disposed below the solid oxide fuel cells and the interconnect, and assembles the planar solid oxide fuel cell stack in accordance with the top cap.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Figure 1:
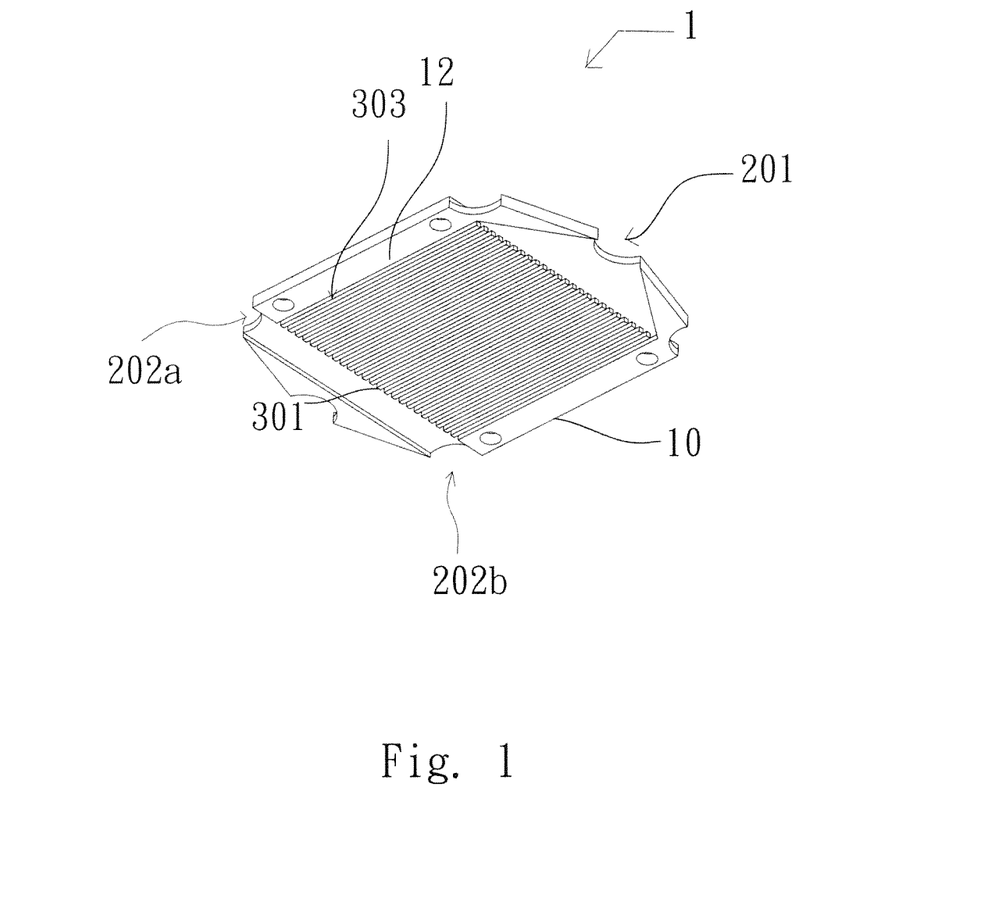
FIG. 1 shows a schematic view of an anode side of a hexagonal interconnect in accordance with one embodiment of the present invention.
Figure 2:
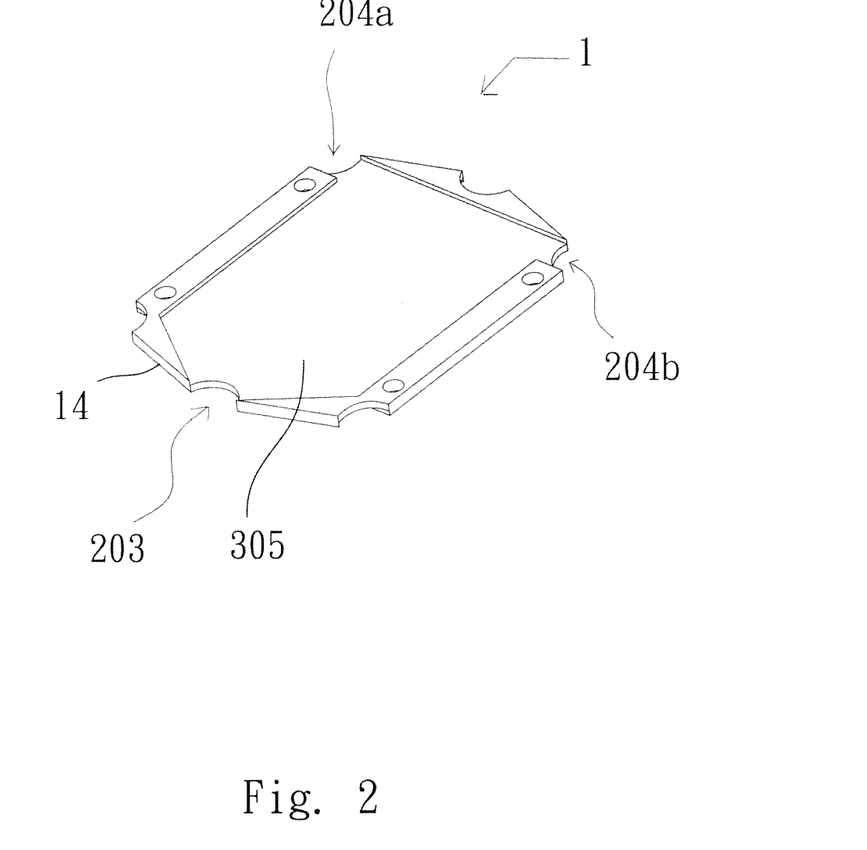
FIG. 2 shows a schematic view of a cathode side of a hexagonal interconnect in accordance with one embodiment of the present invention.

Please refer to FIG. 1 and FIG. 2, which show an interconnect of a planar solid oxide fuel cell stack in accordance with one embodiment of the present invention, wherein FIG. 1 shows a schematic view of an anode side (here-in-after a first flowing area) of the interconnect while FIG. 2 shows a schematic view of a cathode side (here-in-after a second flowing area) of the interconnect. As shown in FIG. 1 and FIG. 2, the interconnect 1 of the present invention comprises an interconnect body 10, a first flowing area 12 and a second flowing area 14, wherein the first flowing area 12 and the second flowing area 14 are respectively disposed on two opposite sides of the interconnect body 10. On one end of the first flowing area 12 is a first gas inlet 201 and on the other end of the first flowing area 12 are two first gas outlets 202a、202b which connect with the first gas inlet 201. Similarly, on one end of the second flowing area 14 is a second gas inlet 203 and on the other end of the second flowing area 14 are two second gas outlets 204a、204b which connect with the second gas inlet 203. According to the embodiment of the present invention, the second gas inlet 203 is configured between the two first gas outlets 202a、202b and the first gas inlet 201 is configured between the two second gas outlets 204a、204b. On account of the above, it is believed that on each side of the interconnect according to the embodiment of the present invention is involved with one gas inlet and two gas outlets, and a flow of the first gas on the anode side of the interconnect and a flow of the second gas on the cathode side of the interconnect form a counter-flow pattern.

To be more specific, as referring to FIG. 1, it is shown that there are a plurality of ribs 301 disposed on the first flowing area 12 of the interconnect, such that a plurality of flow channels 303 are formed between each two adjacent ribs 301 and the first gas flows in the flow channels 303. According to one embodiment of the present invention, the first gas flowing on the anode side of the interconnect can be hydrogen or natural gas. As a result, the first gas flows into the first flowing area 12 of the interconnect through the first gas inlet 201. On the other hand, as referring to FIG. 2, in order to solve the prior problems that powering efficiency was too low since the ribs of the interconnect covered the cathode of the cell stack, there are no ribs disposed on the cathode side of the interconnect 1 of the present invention. In stead, the present invention utilizes conductive aperture material or metal net 305 between the interconnect and its connecting fuel cell, such that the second gas can easily diffuse into the cathode side when it flows into the interconnect 1 of the present invention. According to one embodiment of the present invention, the second gas flowing on the cathode side of the interconnect can be oxygen or air. As a result, the second gas flows into the second flowing area 14 of the interconnect through the second gas inlet 203. Moreover, since the metal net 305 can be considered as a buffer between the fuel cell and the cathode side of the interconnect, the prior problems that the fuel cell may crack easily when it expands under high operating temperature, are successfully solved.

Figure 3:
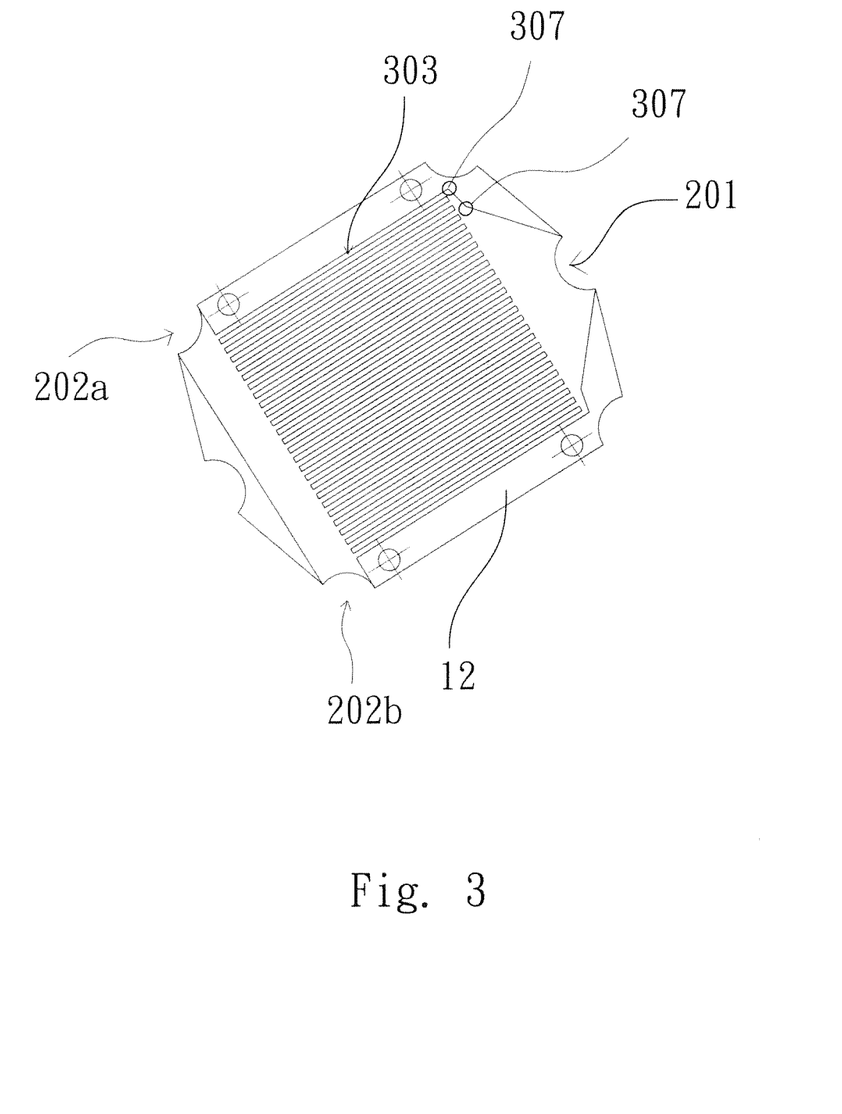
FIG. 3 shows a schematic view of an anode side of a hexagonal interconnect in accordance with another embodiment of the present invention.
Figure 11:
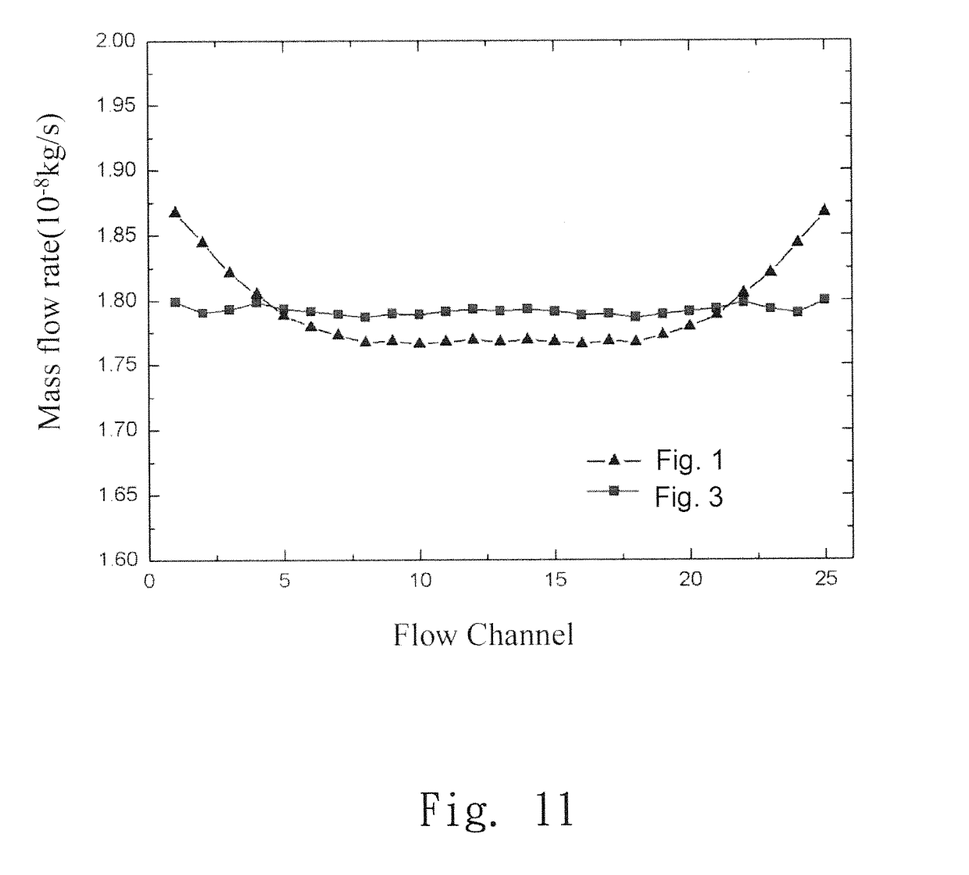
FIG. 11 shows the experimental results of pattern designs in FIG. 1 and FIG. 3 of the present invention.

FIG. 3 shows an interconnect of a planar solid oxide fuel cell stack in accordance with another embodiment of the present invention, which is a schematic view of an anode side of the interconnect according to another embodiment of the present invention. Being different from FIG. 1, the interconnect in FIG. 3 comprises at least two turning portions 307 which are disposed between the flow channel 303 on edge of the interconnect and the first gas inlet 201 on the first flowing area 12. By employing the turning portions 307 on the first flowing area 12, the flow of the first gas on edges of the anode side is slowed down since its flow path is lengthened. As such, the first gas cannot easily diffuse to edges of the anode side, thereby making its flow distribution uniform. According to the embodiment of the present invention, as shown in FIG. 11 which shows the experimental results of the present invention, it is apparent that a difference between the maximum mass flow rate and the minimum mass flow rate in the flow channel is merely 0.7% when comparing the turning-portions design in FIG. 3 to FIG. 1. Therefore, it is obvious that the mass flow rate in each flow channel of FIG. 3 is almost the same, so as to reach a goal of uniform gas flow distribution.

Figure 4:
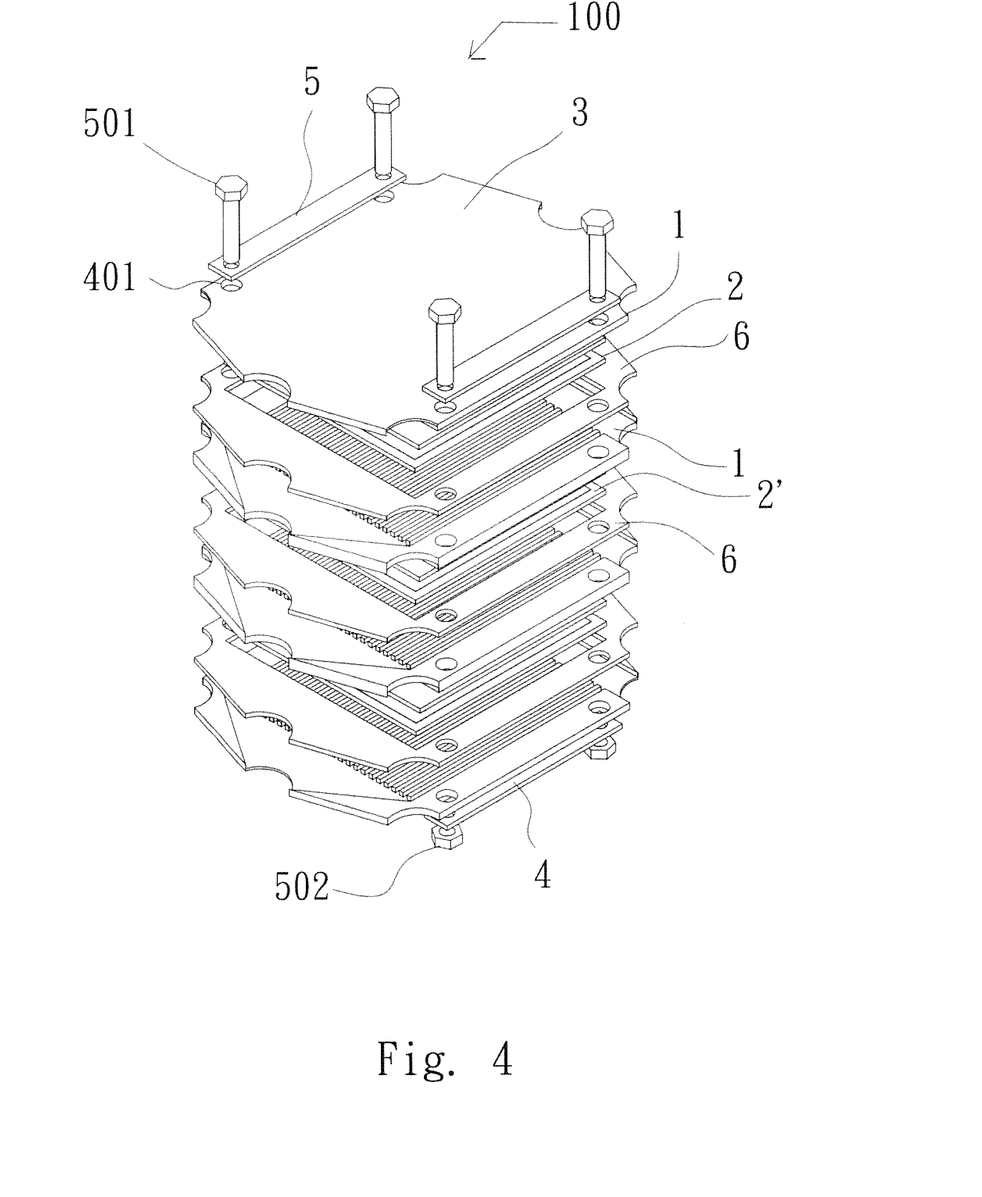
FIG. 4 shows a decomposing view of a hexagonal planar solid oxide fuel cell stack in accordance with one embodiment of the present invention.
Figure 5:
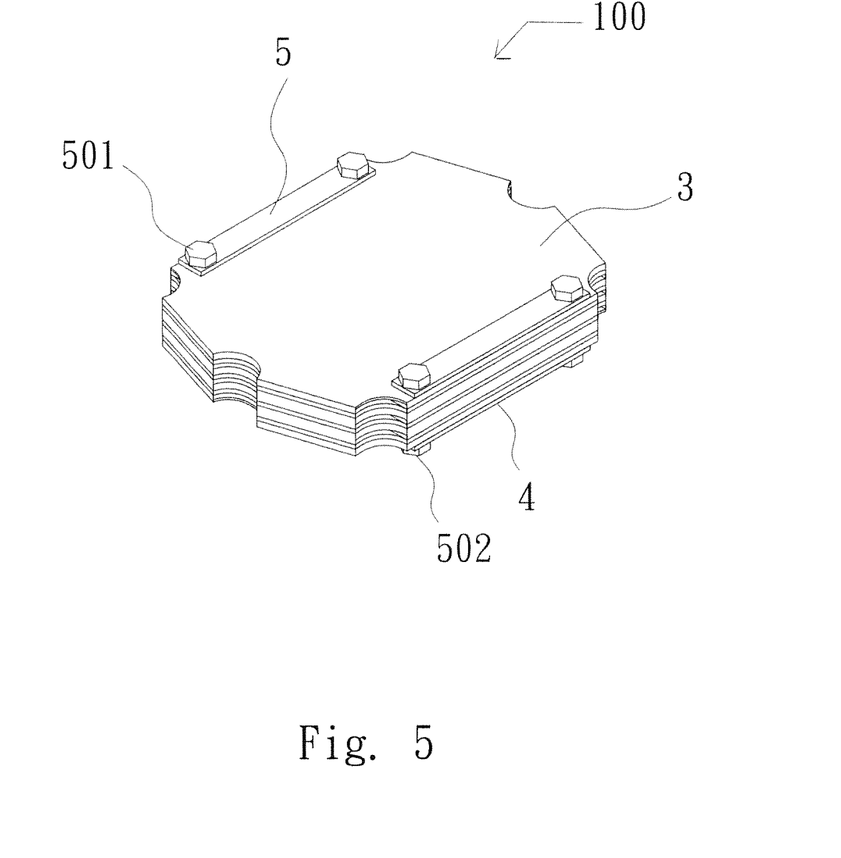
FIG. 5 shows a composing view of a hexagonal planar solid oxide fuel cell stack in accordance with one embodiment of the present invention.

Furthermore, please refer to FIG. 4 and FIG. 5, which show a planar solid oxide fuel cell stack in accordance with one embodiment of the present invention, wherein FIG. 4 shows a decomposing view of the planar solid oxide fuel cell stack while FIG. 5 shows a composing view of the planar solid oxide fuel cell stack. As shown in FIG. 4 and FIG. 5, the planar solid oxide fuel cell stack 100 of the present invention comprises an interconnect 1, two solid oxide fuel cell (SOFC) 2、2', a top cap 3, a bottom base 4, at least two isolating parts 5 and a sealing spacer 6. The interconnect 1 is disposed there in between two solid oxide fuel cell (SOFC) 2、2' and is for collecting their current generated. The detailed description of the interconnect 1 is fully explained as above, and thus is not repeated again here. As shown in FIG. 4 and FIG. 5, the top cap 3 is configured above the two solid oxide fuel cell (SOFC) 2、2' and the interconnect 1, while the bottom base 4 is configured below the two solid oxide fuel cell (SOFC) 2、2' and the interconnect 1 and assembles the planar solid oxide fuel cell stack 100 in accordance with the top cap 3. Furthermore, on the two solid oxide fuel cell (SOFC) 2、2', the interconnect 1, the top cap 3 and the bottom base 4 are at least four holes 401 such that the above components can be assembled together through a plurality of fixing elements disposed into those holes 401. According to one embodiment of the present invention, the plurality of fixing elements, for example, can be a pair of screw 501 and nut 502.

According to assembly of the present invention, the material of the isolating parts 5 can be mica so as to prevent the cell stack from being short. The isolating part 5 can be selectively disposed between the fixing element and the top cap 3, and/or the fixing element and the bottom base 4. It is shown in FIG. 4 that, the isolating part 5 of the present invention is disposed both between the screw 501 and the top cap 3, and between the nut 502 and the bottom base 4. Therefore, when assembly, the planar solid oxide fuel cell stack 100 of the present invention from top to bottom, comprises: at least four screws 501, the isolating part 5, the top cap 3, the cathode side of the interconnect 1, the solid oxide fuel cell (SOFC) 2, the sealing spacer 6, and the anode side of the interconnect 1. A plurality of previously said interconnect 1, the solid oxide fuel cell (SOFC) 2', the sealing spacer 6 and the anode side of the interconnect 1 can be optionally disposed again. Finally, at the bottom are the bottom base 4, the isolating part 5 and the nut 502. According to one embodiment of the present invention, a thickness of the sealing spacer 6 can be designed to be the same as the solid oxide fuel cell. Furthermore, when connecting the interconnect to the SOFC, additional sealing gel or other material that can be used under high operating temperature may also be applied to its connecting edge so as to avoid the first and/or the second gas from leaking out of the cell stack.

Figure 6:
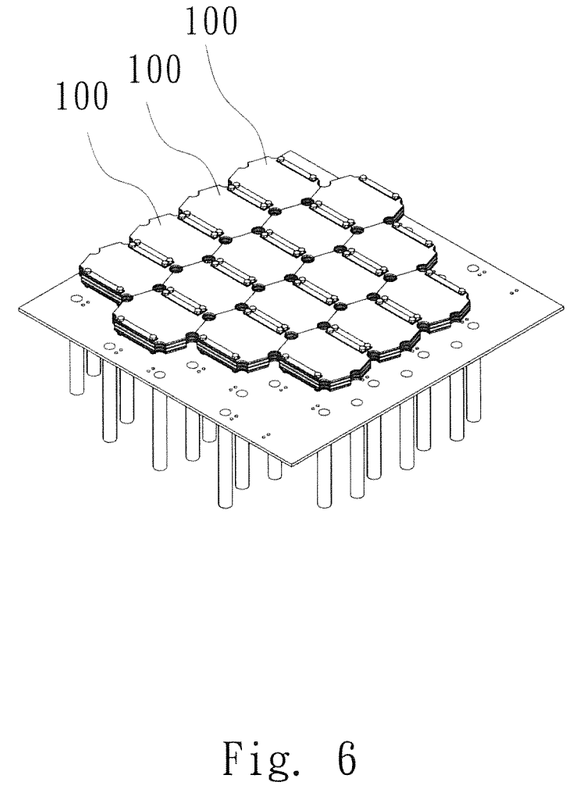
FIG. 6 shows a schematic view of connecting a plurality of planar solid oxide fuel cell stacks in accordance with one embodiment of the present invention.

Afterwards, after one planar solid oxide fuel cell stack 100 is assembled, then a plurality of planar solid oxide fuel cell stacks 100 can be further connected in a vertical and/or horizontal direction to expand its dimension. FIG. 6 shows a schematic view of connecting a plurality of planar solid oxide fuel cell stacks in accordance with one embodiment of the present invention. As shown in FIG. 6, the planar solid oxide fuel cell stack and its interconnect thereof are designed into hexagonal shape so that the first gas inlet 201, the two first gas outlets 202a、202b, the second gas inlet 203 and the two second gas outlets 204a、204b are respectively disposed on each corner of the stack module. As such, when the planar solid oxide fuel cell stack 100 expands in the horizontal direction, every three fuel cell stack will share a same pipeline and comprise two gas inlets and one gas outlet. By designing the planar solid oxide fuel cell stack and its interconnect into hexagonal shape, the first gas and the second gas flow distribution of the present invention have become much more uniform. Moreover, when more than one planar solid oxide fuel cell stack is connected, their production cost, system complexity and material used can also be dramatically saved. Similarly, additional sealing gel or other material that can be used under high operating temperature may also be applied to its connecting edge when connecting more than one planar solid oxide fuel cell stack in order to avoid the first and/or the second gas from leaking out of the cell stack. Apart from that, at least one pair of fixing elements may also be disposed to the bottom base of each or every gas pipeline and the dimension of the bottom base can be arranged based on the numbers of fuel cell stacks in connection to maintain the uniformity of the cell module.

Figure 7:
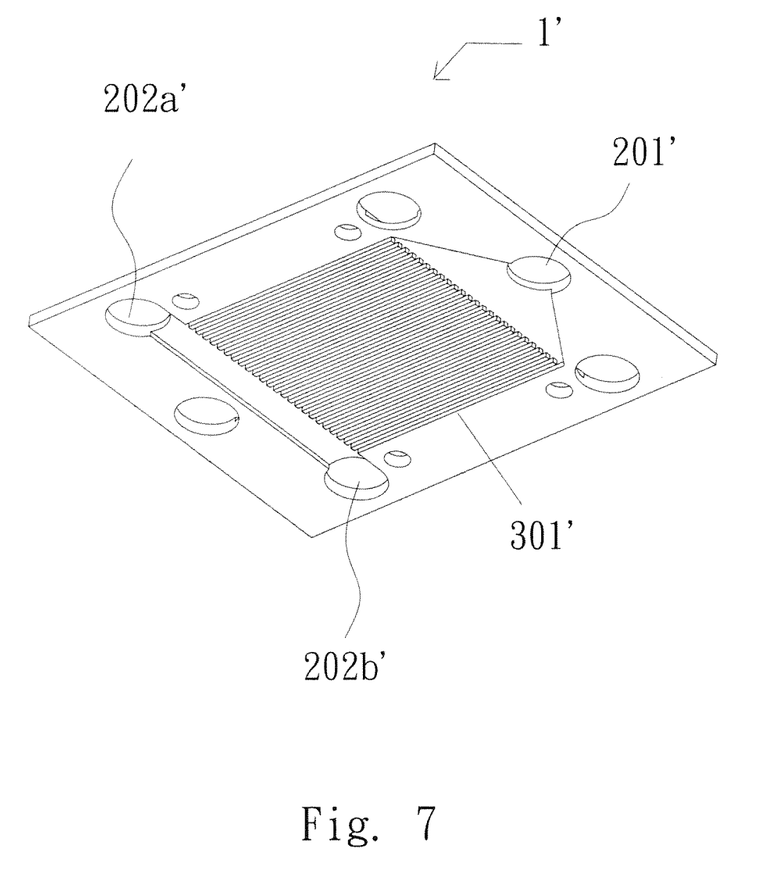
FIG. 7 shows a schematic view of an anode side of a quadrangle interconnect in accordance with another embodiment of the present invention.
Figure 8:
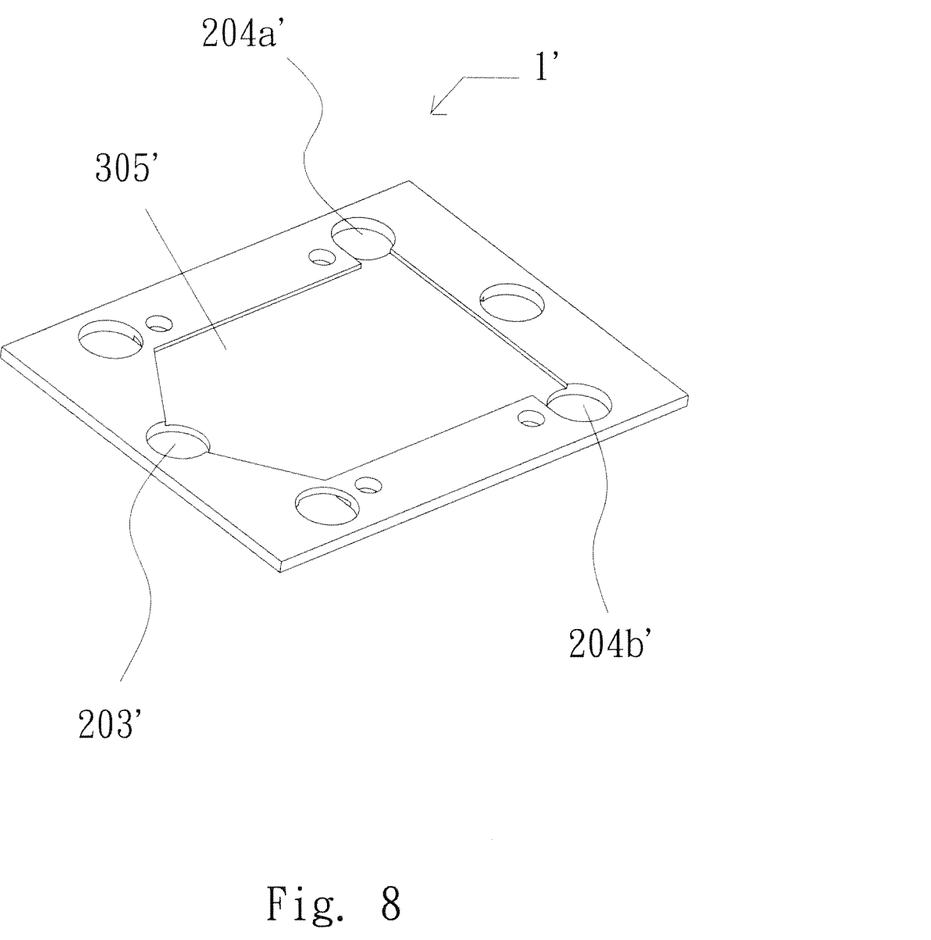
FIG. 8 shows a schematic view of a cathode side of a quadrangle interconnect in accordance with another embodiment of the present invention.

In another aspect, when considering a less demanding solid oxide fuel cell stack which does not need to generate high output voltage, then the planar solid oxide fuel cell stack and its interconnect thereof of the present invention can be designed into quadrangle shape as shown in FIG. 7 and FIG. 8. FIG. 7 shows a schematic view of an anode side of the quadrangle interconnect 1' according to another embodiment of the present invention. The flow channel pattern in FIG. 7 is similar to FIG. 1, which comprises one first gas inlet 201' and two first gas outlets 202a'、202b'. Also, a plurality of ribs 301' are arranged on the anode side so that several flow channels are formed between each two adjacent ribs 301'. FIG. 8 shows a schematic view of a cathode side of the quadrangle interconnect 1' according to this embodiment of the present invention. The flow channel pattern in FIG. 8 is similar to FIG. 2, which comprises one second gas inlet 203' and two second gas outlets 204a'、204b'. The conductive aperture material or metal net 305' may also be disposed when connecting the interconnect 1' to a fuel cell, such that the second gas (oxygen or air) can easily diffuse into the cathode side when it flows into the interconnect 1' of the present invention.

Figure 9:
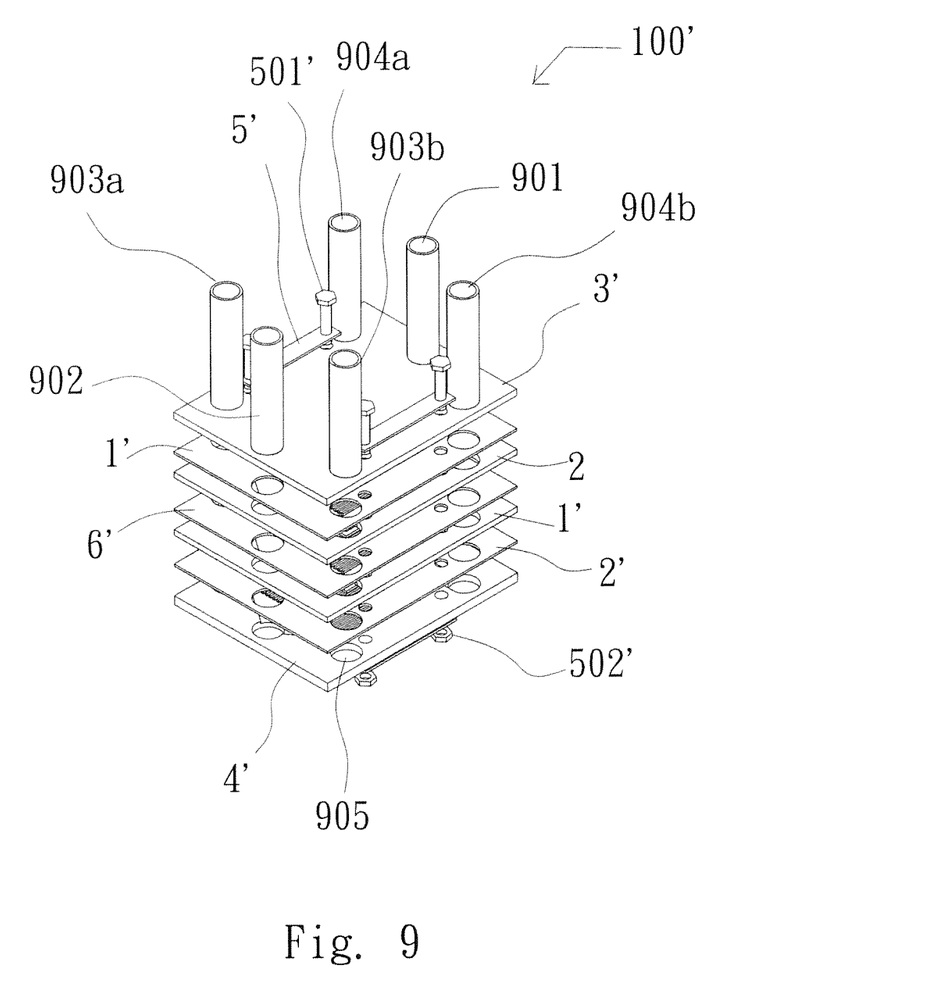
FIG. 9 shows a decomposing front view of a quadrangle planar solid oxide fuel cell stack in accordance with another embodiment of the present invention.
Figure 10:
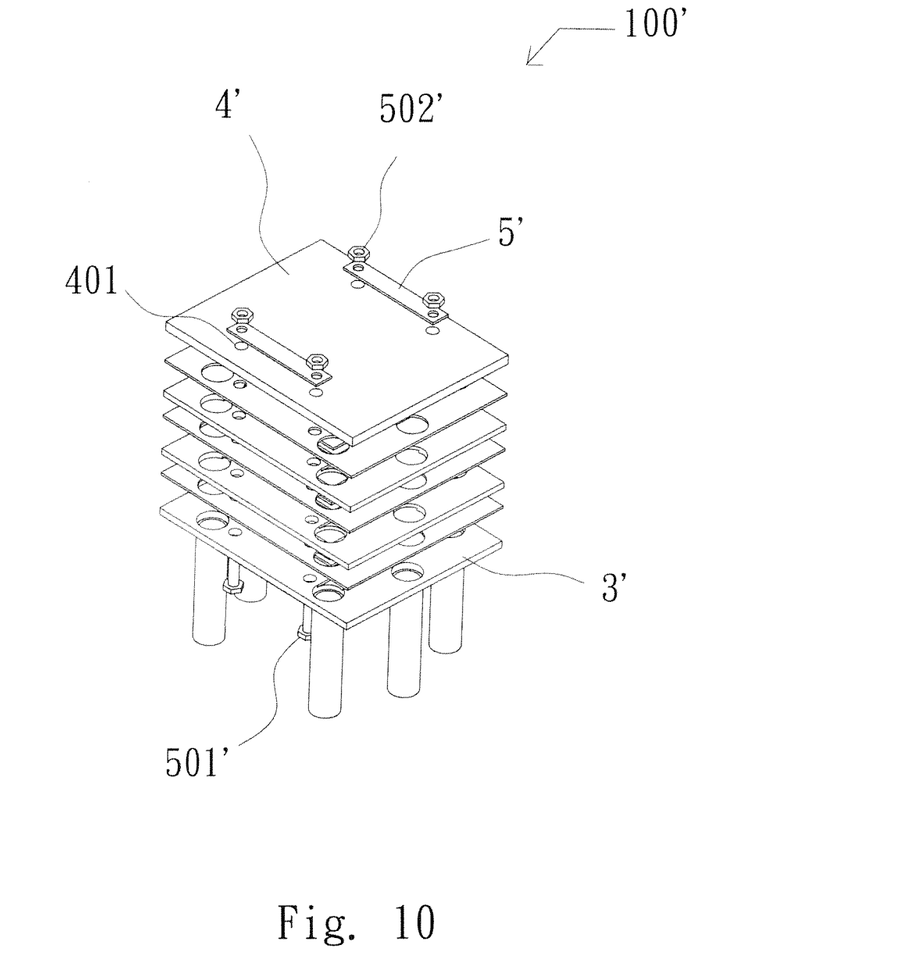
FIG. 10 shows a decomposing back view of a quadrangle planar solid oxide fuel cell stack in accordance with another embodiment of the present invention.

Furthermore, please refer to FIG. 9 and FIG. 10, which show a quadrangle planar solid oxide fuel cell stack in accordance with another embodiment of the present invention, wherein FIG. 9 shows a decomposing front view of the quadrangle planar solid oxide fuel cell stack while FIG. 10 shows a decomposing back view of the quadrangle planar solid oxide fuel cell stack. As shown in FIG. 9 and FIG. 10, the quadrangle planar solid oxide fuel cell stack 100' of the present invention from top to bottom, comprises: at least four screws 501', the isolating part 5', the top cap 3', the cathode side of the interconnect 1', the solid oxide fuel cell (SOFC) 2, the sealing spacer 6', and the anode side of the interconnect 1'. A plurality of previously said interconnect 1', the solid oxide fuel cell (SOFC) 2', the sealing spacer 6' and the anode side of the interconnect 1' can be optionally disposed again. Finally, at the bottom are the bottom base 4', the isolating part 5' and the nut 502'. The only difference between this embodiment shown in FIG. 7~8 and the embodiment shown in FIG. 4 is that the shape of the fuel cell module in FIG. 7~8 is quadrangle. As a result, the detailed description about the structure of the quadrangle fuel cell module is quite the same and will not be repeated again hereinafter. Below, the first and second gas flow of the present invention will be explained.

As referring to FIG. 9 and FIG. 10, in real application, the top cap 3 of the present invention is connecting to a first gas inlet tube 901, a second gas inlet tube 902, two first gas outlet tubes 903a、903b, and two second gas outlet tubes 904a、904b. As such, the first gas is led into the interconnect through the first gas inlet tube 901 and the second gas is led into the interconnect through the second gas inlet tube 902, wherein the first gas for example, is hydrogen or natural gas and the second gas for example is oxygen or air. Since the first gas inlet tube 901 is in connection with the first gas inlet 201', the two first gas outlets 202a'、202b' and the two first gas outlet tubes 903a、903b of the interconnect 1', the first gas can accordingly pass through an anode side of the interconnect 1 via the above mentioned inlets and outlets, and finally flow out of the planar solid oxide fuel cell stack 100' through the first gas outlet tubes 903a、903b.

Similarly, the second gas inlet tube 902 is in connection with the second gas inlet 203', the two second gas outlets 204a'、204b' and the two second gas outlet tubes 904a、904b of the interconnect 1'. Therefore, the second gas can accordingly pass through a cathode side of the interconnect 1' via the above mentioned inlets and outlets, and finally flow out of the planar solid oxide fuel cell stack 100' through the second gas outlet tubes 904a、904b. It shall be noticed that in this embodiment, a plurality of concaves 905 are disposed in the bottom base 4' and the positions they are disposed are each corresponding to the previously mentioned first gas inlet tube 901, second gas inlet tube 902, first gas outlet tubes 903a、903b, and second gas outlet tubes 904a、904b. Therefore, the bottom base 4' forms a non-penetrating bottom design. By employing the non-penetrating bottom design, the prior problems that the mass flow rate in the bottom of the cell module was always low is successfully solved. In other words, the vertical gas flow of the fuel cell module is uniform when the concaves 905 are applied in the bottom base of the present invention. Nevertheless, this embodiment described is only for demonstrating the technical contents and characteristics of the present invention and to enable the persons skilled in the art to understand, make, and use the present invention. However, it is not intended to limit the scope of the present invention. Therefore, any equivalent modification or variation such as applying the non-penetrating bottom design to any shape of the fuel cell stack (hexagonal, quadrangle or the like) according to the spirit of the present invention is to be also included within the scope of the present invention.

As a result, to sum up, a novel planar solid oxide fuel cell stack and its interconnect thereof have been provided in the present invention to provide a uniform gas flow distribution. The interconnect itself comprises a first and second side, which are respectively an anode side and a cathode side of the interconnect. On the anode side are a plurality of ribs which accordingly form flow channels for the first gas to flow through. The first gas is led into the anode side through a first gas inlet and out of the interconnect through two first gas outlets. On the cathode side are conductive aperture material or metal net 305 disposed between the interconnect and the fuel cell such that the second gas (oxygen or air) can easily diffuse to the cathode side and thus increase the reactive area of the fuel cell module and its powering efficiency as well.

Moreover, in another aspect, when considering a less demanding solid oxide fuel cell stack, the planar solid oxide fuel cell stack and its interconnect thereof of the present invention may be designed into quadrangle shape. As a result, the production cost, production complexity and material used in the cell module can be greatly saved, thereby accordingly increase the potential of the module in recent markets and recent researches too.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An interconnect disposed between two solid oxide fuel cells for collecting current generated, comprising:
  an interconnect body;
  a first flowing area, disposed on a first side of said interconnect body, wherein on one end of said first flowing area is a first gas inlet and on the other end of said first flowing area are two first gas outlets which connect with said first gas inlet; a plurality of ribs disposed on said first flowing area; and a plurality of flow channels formed between each two adjacent said ribs such that a first gas flows in said flow channels; and
  a second flowing area, disposed on a second side of said interconnect body, wherein on one end of said second flowing area is a second gas inlet and on the other end of said second flowing area are two second gas outlets which connect with said second gas inlet, said second gas inlet is disposed between said two first gas outlets, and said first gas inlet is disposed between said two second gas outlets, and wherein said second flowing area is devoid of ribs and flow channels and comprises a conductive aperture material or metal net disposed on said second flowing area.

2. The interconnect of claim 1, further comprising a first gas which flows into said first flowing area through said first gas inlet and said first gas is hydrogen or natural gas.

3. The interconnect of claim 2, further comprising a second gas which flows into said second flowing area through said second gas inlet and said second gas is oxygen or air.

4. The interconnect of claim 1, wherein said interconnect body is designed into hexagonal or quadrangle shape.

5. The interconnect of claim 1, further comprising at least two turning portions which are disposed between said flow channels on edge of said interconnect body and said first gas inlet on said first flowing area.

* * * * *